June 2, 1964
H. D. BAUMANN
3,135,286
CONTROL VALVE
Filed April 13, 1962
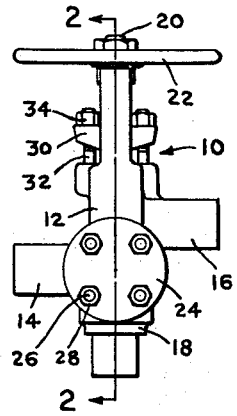
FIG. 1
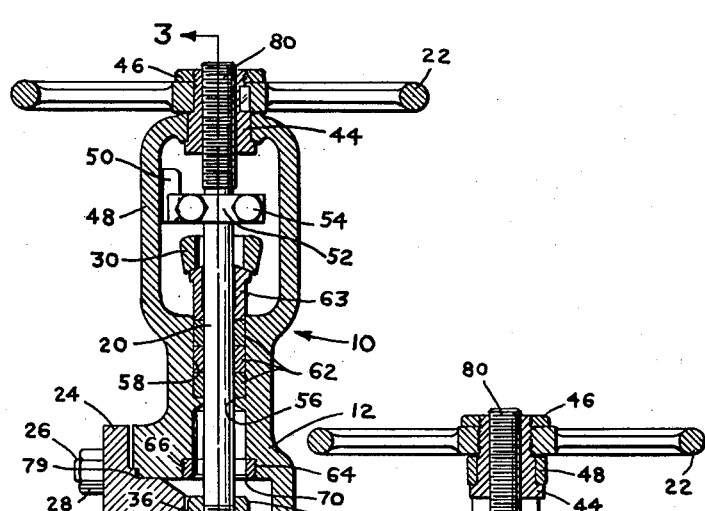
FIG. 2
FIG. 3
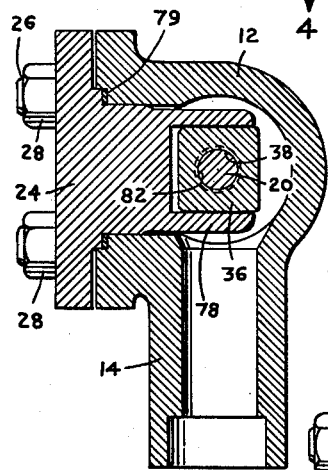
FIG. 4
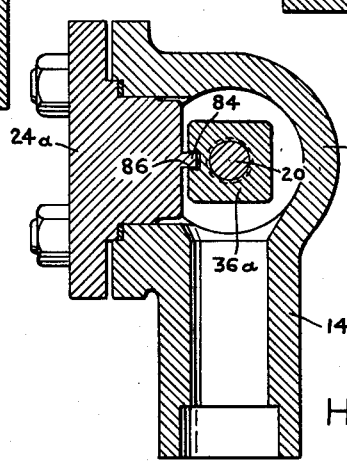
FIG. 5
HANS D. BAUMANN
INVENTOR.
BY Daniel A. Bolis
atty.

3,135,286
CONTROL VALVE
Hans D. Baumann, Sharon, Mass., assignor to Worthington Corporation, Harrison, N.J., a corporation of Delaware
Filed Apr. 13, 1962, Ser. No. 187,421
4 Claims. (Cl. 137—315)

This invention relates generally to control valves. More particularly the invention relates to control valves for use in high temperature, high pressure or nuclear service wherein line welding is required. Still more particularly the invention relates to three-way control valves in which ready access is had to the working parts thereof.

The use of three-way control valves is well known in the prior art but they required a heavy flanged connection through which the valve seat and valve plug is inserted.

It is the object of the present invention to overcome this disadvantage and to provide a control valve having ready access to the parts thereof.

In accordance with the present invention a control valve is provided to regulate the passage of fluid therethrough comprising (a) a body having an inlet and a plurality of outlets,
(b) a valve seat disposed in said body and adapted to be moved between said outlets to regulate the flow of fluid therethrough,
(c) guide means connected to said body in operative association with said valve seat to prevent rotation of said valve seat on movement thereof,
(d) a valve stem connected to said valve seat,
(e) actuating means engaging said valve stem and adapted to raise and lower said valve stem and said valve seat whereby said valve seat will regulate the flow of fluids through said outlets.

One of the objects of this invention is to provide for limited disassembly of the control valve without disturbing the in line welding.

Another object of this invention is to provide for easy access to the inside of the control valve.

Another object of this invention is to provide a simple and reliable control valve.

Still another object of this invention is to provide a control valve for use in high temperature or high pressure or nuclear service.

With these and other objects in view as may appear from the accompanying specification, the invention consists of various features of construction and combination of parts which will be first described in connection with the accompanying drawings showing the novel control valve of a preferred form and the features forming the invention will be specifically pointed out in the claims.

In the drawings:

FIGURE 1 is an elevation of the novel control valve.
FIGURE 2 is a section taken at line 2—2 of FIGURE 1.
FIGURE 3 is a section taken at line 3—3 of FIGURE 2.
FIGURE 4 is a section taken at line 4—4 of FIGURE 2.
FIGURE 5 is a modified form of section 4—4 of FIGURE 2.

Referring more particularly to the drawings, FIGURE 1 shows the novel control valve 10.

Control valve 10 has a body 12 with an inlet 14 and a horizontal outlet 16 and a vertical outlet 18. It is understood that it is within the scope of the invention to reverse the fluid flow whereby there would be two inlets feeding into a single outlet and furthermore a single inlet and a single outlet can also be used instead of the preferred form shown.

As illustrated in FIGURES 2 and 3 body 12 has a valve stem 20 disposed in bore 56. Access element 24 is connected to body 12 by means of studs 26 with nuts 28 disposed thereon and gasket 79 insures a fluid tight seal therebetween. Access element 24 has an integrally formed fork 78 between which is diposed valve seat 36 prior to connection to body 12.

Adjacent to outlet 16 in body 12 an upper seat insert 64 is suitably connected thereto as by engagement of the threaded circumference 66 and peripheral weld 68. Insert 64 has a tapered seating surface 70.

Outlet 18 can be integrally formed in body 12, however, in the preferred form it is a separate element suitably connected as by engagement of the threaded circumference 72 and subsequently by peripheral weld 74. Outlet 18 has a tapered seating surface 76 therein.

Valve seat 36 as shown in FIGURE 4 has a square cross-section, however, this can be modified to any suitable shape. Valve seat 36 is connected to valve stem 20 by the loose fitting threaded engagement of the lower threaded portion 82 of stem 20 into threaded bore 38. Valve seat 36 has an upper tapered seat 40 and a lower tapered seat 42 which correspond to seating surfaces 70 and 76 respectively and is adapted to shut off either on being raised or lowered with stem 20. Furthermore as the valve seat 36 is prevented from rotation valve stem 20 can be readily detachably engaged therein. Also once assembled fluid vibrations will not disturb the position as the valve seat 36 is locked in position inside fork 78.

A modified form of the valve seat and access element is shown in FIGURE 5 in which valve seat 36a has a groove 86 disposed between the tapered seats 40 and 42 thereof. Disposed into groove 86 is the leg 84 of the modified access element 24a. The operation is the same and accordingly valve seat 36a is prevented from rotation or movement thereof.

Subsequent to the assembly of the access element 24 and the valve seat 36 having the valve stem 20 therein packing rings 62 are disposed in counterbore 58. Gland 63 and packing gland flange 30 hold the rings in place. Flange 30 is assembled by engagement of nuts 34 in studs 32. It is understood that this assembly can be done before or after the stem 20 engages the valve seat 36.

Hand wheel 22 is fixedly connected to element 44 which is disposed through the yoke 48 and is locked into position by locking nut 46. Valve stem 20 is threadedly engaged at its upper threaded portion 80 in element 44 and by turning the hand wheel 22 in either direction will be raised or lowered depending on the direction turned. To prevent the stem 20 from rotating on the hand wheel 22 being turned an indicator guide 50 is mounted thereon by bolts 54. Indicator guide 50 engages guide projection 52 which allows for vertical movement by restraining the rotatable movement of stem 20. Thus when the hand wheel is turned the engagement of the element 44 and the upper threaded portion 80 will cause axial movement of stem 20 which will accordingly be raised or lowered dependent on whether the hand wheel 22 is turned in one direction or the other. Indicator guide 50 also functions to show the relative position of the valve seat 36.

It is understood that it is within the scope of this invention to replace the manually operated hand wheel with an automatically operated actuating means which is operative responsive either to rotatable motion or axial motion and in such cases the connecting elements would be modified accordingly.

It will be understood that this invention is not to be limited to the specific construction or arrangement of parts shown but that they may be widely modified within the invention defined by the claims.

What is claimed is:

1. A control valve to regulate the flow of fluid therethrough comprising:
    (a) a body having an inlet and at least two outlets therein,
    (b) a valve seat disposed in the body and adapted to be moved between the outlets to regulate the flow of fluid therethrough,
    (c) the valve seat having an upper threaded portion,
    (d) a valve stem having a lower threaded portion,
    (e) the lower threaded portion of the valve stem threadedly connected to the upper threaded portion of the valve seat in operative association thereto,
    (f) actuating means connected to the upper end of the valve stem to actuate the valve stem and the valve seat to regulate the flow of fluid through the valve,
    (g) a first guide means connected to the body in operative association with the valve seat to prevent rotation of the valve seat during the threaded engagement or disengagement of the valve stem and valve seat, and the movements thereof,
    (h) a second guide means connected to the valve stem to prevent the valve stem from rotating responsive to movement of the actuating means during normal operation and adapted to be removed to permit the valve stem to be rotatably removed from the non-rotating valve seat.

2. A control valve to regulate the flow of fluids therethrough comprising:
    (a) a body having an inlet and a plurality of outlets therein,
    (b) a valve seat disposed in the body and adapted to be moved between the outlets to regulate the flow of fluid therethrough,
    (c) the valve seat having a threaded bore therein,
    (d) a valve stem having a threaded portion at both ends ends thereof,
    (e) the lower threaded portion of the valve stem threadedly connected in the threaded bore of the valve seat,
    (f) actuating means in threaded engagement with the upper threaded portion of the valve stem to raise or lower the valve stem and the valve seat whereby the flow of fluid through the valve is regulated,
    (g) a first guide means connected to the body in operative association with the valve seat to prevent rotation of the valve seat during the threaded engagement of disengagement of the valve stem and valve seat, and the movements thereof,
    (h) a second guide means connected to the valve stem to prevent the valve stem from rotating responsive to movement of the actuating means during normal operation and adapted to be removed to permit the valve stem to be rotatably removed from the non-roating valve seat.

3. The combination claimed in claim 2 wherein access means disposed in the body at the junction of the inlet and the outlets whereby on the valve seat being disengaged from the valve stem the valve seat can be removed from the body.

4. The combination claimed in claim 2 wherein:
    (a) the valve seat has a non-circular periphery,
    (b) said first guide means adapted to engage the non-circular periphery of the valve seat to prevent rotation of the valve seat and to permit movement thereof between the outlets.

References Cited in the file of this patent

UNITED STATES PATENTS

| 921,981 | Halley | May 18, 1909 |
| 1,679,907 | La Bour | Aug. 7, 1928 |
| 2,741,264 | Leonard | Apr. 10, 1956 |

FOREIGN PATENTS

| 154,601 | Great Britain | May 19, 1921 |